UNITED STATES PATENT OFFICE.

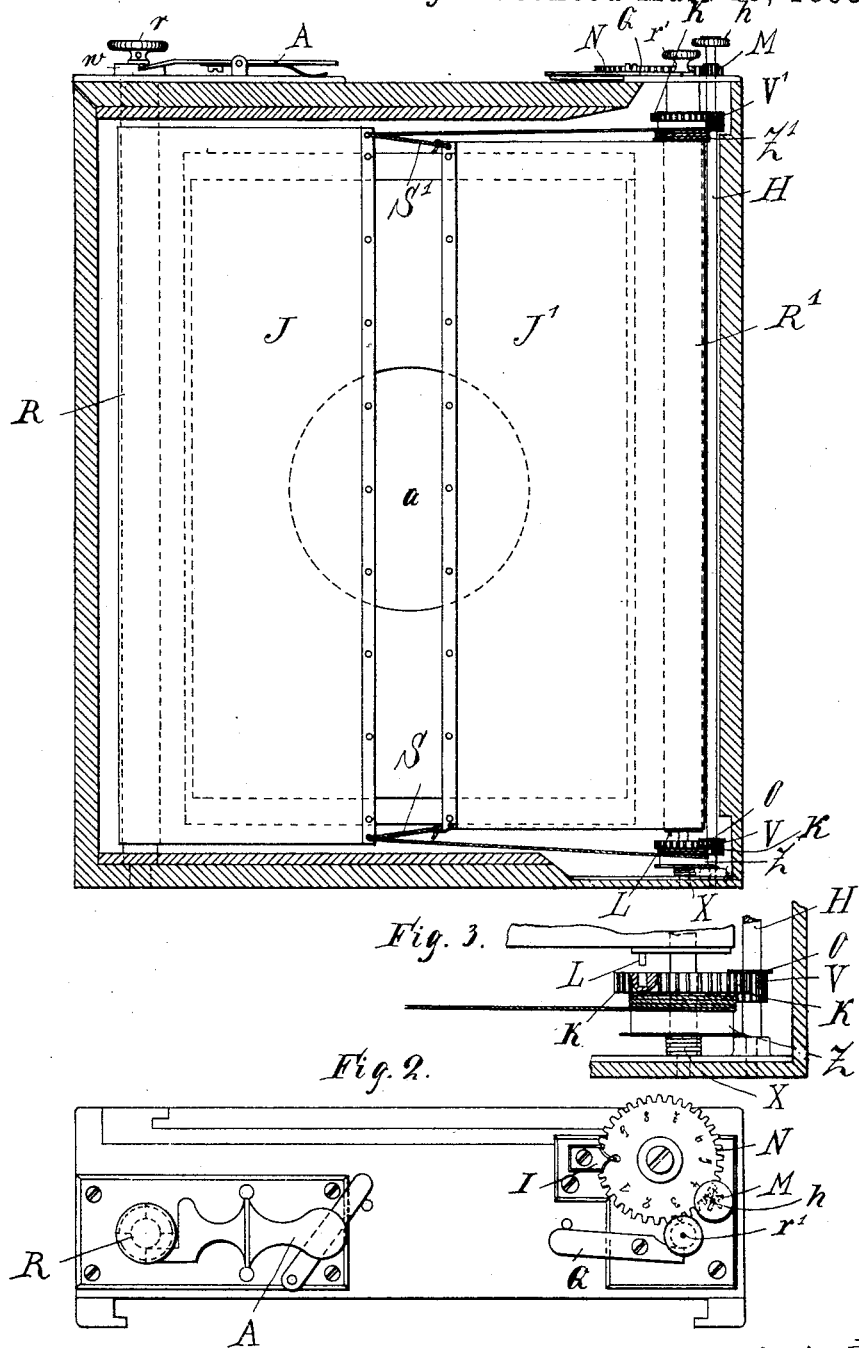

WALTER OEHMKE, OF BERLIN, ASSIGNOR TO CARL PAUL GOERZ, OF SCHÖNEBERG, GERMANY.

PHOTOGRAPHIC-CURTAIN SHUTTER.

SPECIFICATION forming part of Letters Patent No. 535,850, dated March 19, 1895.

Application filed November 5, 1894. Serial No. 527,905. (No model.) Patented in Austria October 3, 1894.

*To all whom it may concern:*

Be it known that I, WALTER OEHMKE, a subject of the German Emperor, residing at 35 Dorotheenstrasse, Berlin, Germany, have invented certain new and useful Improvements in Photographic-Curtain Shutters, (for which I have obtained Letters Patent in Austria, dated October 3, 1894, not yet numbered;) and I do hereby declare the following to be a clear and exact description of the invention.

My invention has relation to devices for operating the shutters of photographic cameras, and it has for its object the provision of means whereby such shutters may be readily adjusted and instantaneously closed, as will now be fully described, reference being had to the accompanying drawings, in which—

Figure 1 is a sectional elevation and Fig. 2 a top plan view of so much of a photographic camera as is necessary to illustrate my invention, and Fig. 3 is a sectional detail view.

The shutter is constructed of flexible opaque material in two parts, J and J', the part J adapted to wind on and off a roller R which carries a suitable knob $r$ for revolving the same, an annular flange $w$ on said knob being provided with notches engaged by a spring-actuated pawl or detent A fulcrumed in a bracket on top of the camera.

The part J' of the shutter is adapted to be wound on and off a roller R' that is actuated by means of an internal spring in a well known manner to revolve in a direction to automatically wind up said section J'. The shaft of roller R' projects outside of the camera, and carries a knob $r'$ at its outer end by means of which said shaft can be revolved to wind up its actuating spring, the said shaft being held against rotation in a direction to unwind said spring by a pawl Q adapted to engage a notch in a collar or annular flange on said knob $r'$.

The shutter sections are connected by means of two cords S and S', one end of which is fastened to the upper and lower corners respectively of shutter section J', the cords being passed through eyelets or holes in the corresponding corners of section J and the opposite ends secured to winding drums Z and Z' on the shaft of roller R'. It is obvious that when the shutter sections are properly adjusted to leave the necessary light slit or opening between them they will be held against displacement under the action of the spring in roller R' by the detent A, and that when said detent is disengaged from the knob $r$ both rollers will be free to revolve, and under the action of the spring in roller R' said roller will be revolved to wind section J' thereon and to unwind section J from roller R, the movement being an instantaneous one, whereby section J is drawn across the light aperture or lens $a$ of the camera. It is further obvious that if after the described operation, the roller R is revolved to wind up the section J of the shutter, the section J' will be correspondingly unwound from the roller R', the latter revolving against the stress of its spring, which is wound up thereby.

For the purpose of adjusting the light slit or space between the shutter sections relatively to the desired time of exposure, I mount the winding drums Z and Z' loosely on the shaft of roller R' said drum Z having endwise motion on said shaft against the stress of a coiled spring X, and I provide an endwise movable spindle H that projects beyond the top of the camera and carries a knob $h$ and three pinions, M, V' and V. The pinion M meshes with a gear N loosely mounted on a journal on top of the camera, and provided with a graduated scale, an index I projecting over the gear N, indicating the rotary displacement of the gear. The pinions V' and V mesh with the gears K', K, on drums Z', Z, respectively, the toothed face of the pinion V' being of such width as to remain in gear with the wheel K when spindle H is moved in one or the other direction. The pinion V has a radial arm or annular flange O adapted to engage the gear K, which latter has a recess or hole for a pin L on roller R', by means of which the drum Z is coupled to said roller under the action of spring X when the spindle H is moved upwardly by said spring.

It will be seen that when the spindle H is pressed down, the drum Z will be uncoupled from roller R', and inasmuch as both drums are loose on the shaft of said roller R' they can be revolved independently thereof through the medium of said spindle to wind or unwind shutter section J' for the purpose of regulating the space between the two shutter sections. The downward movement of the spindle also causes the pinion M to mesh with gear N which is revolved about its journal when said spindle is revolved, the fixed index I indicating the rotary displacement of said gear, and consequently the increase or decrease in the width of the space between the shutter sections, since it is obvious that when the drums are revolved to unwind the cords S, the shutter section J' will be wound on roller R' by the spring thereof to widen the space between said section and section J, which is held stationary by the detent lever A. The reverse takes place when the drums Z Z' are revolved to wind up said cords S, thereby unwinding shutter section J' against the stress of the spring of roller R' by the draft of said cords upon said section J', section J being still held stationary. On the other hand, when the spindle H is released, the spring X will move the same as well as the drum Z into its normal position, said drum being coupled to the roller R' while the drum Z' will be coupled to said roller through the medium of the said spindle, the pinion M moving out of gear with wheel N.

Having thus described my invention, what I claim as new therein, and desire to secure by Letters Patent, is—

1. In a photographic camera, two revoluble rollers, a shutter constructed of a flexible opaque material in two sections adapted to wind on and off said rollers, a locking device for locking one of the rollers against rotation in an unwinding direction, means adapted to automatically revolve the other roller in a winding direction, a flexible connection between the shutter sections, and mechanism adapted to be operated from the outside of the camera and to lengthen or shorten the flexible connection between the shutter sections for the purpose of widening or contracting the light aperture between said sections.

2. In a photographic camera, a shutter composed of two flexible opaque sections J and J', two rollers R and R' on and off which said sections are adapted to wind, a detent mechanism adapted to lock roller R against rotation in an unwinding direction, an actuating device adapted to revolve roller R' in a winding direction, a winding drum at each end of said roller R', said drums loose on the roller shaft, a coupling device for coupling one of the drums to said roller R', and cords secured to shutter section J' and the winding drums respectively and passing through holes in shutter section J, in combination with appliances adapted to uncouple the said drum from the said roller R' and revolve both drums independently of the roller in one or the other direction, for the purpose set forth.

3. In a photographic camera, a shutter composed of two flexible opaque sections J and J', two rollers R and R' on and off which said sections are adapted to wind, a detent mechanism adapted to lock roller R against rotation in an unwinding direction, an actuating device adapted to revolve roller R' in a winding direction, a winding drum at each end of said roller R', said drums loose on the roller shaft, a coupling device for coupling one of the drums to said roller R' and cords secured to shutter section J' and the winding drums respectively and passing through holes in shutter section J, in combination with appliances adapted to uncouple the said drum from the said roller R' to revolve both drums in one or the other direction independently of the said roller and to couple both drums to the roller, for the purposes set forth.

4. In a photographic camera, a shutter composed of two flexible opaque sections J and J', two rollers R and R' on and off which said sections are adapted to wind, a detent mechanism adapted to lock roller R against rotation in an unwinding direction, an actuating device adapted to revolve roller R' in a winding direction, a winding drum at each end of said roller R', said drums loose on the roller shaft, a coupling device for coupling one of the drums to said roller R' and cords secured to shutter section J' and the winding drums respectively and passing through holes in shutter section J, in combination with appliances adapted to uncouple the said drum from the said roller R' to revolve both drums in one or the other direction independently of the said roller and to couple both drums to the roller, said appliances adapted to be operated from the outside of the camera.

5. The combination with the revoluble roller R, the shutter section J adapted to wind on and off the same, and a locking device for locking said roller against rotation in an unwinding direction, the roller R' revoluble automatically in a winding direction, the shutter section J' adapted to wind on and off the same, winding drums loose on the shaft of said roller R' and cords secured respectively to shutter section J' and said winding drums and passing through holes in shutter sections J, and a coupling device adapted to couple one of the drums to its shaft, of a spindle adapted to be manipulated from the outside of the camera, and devices connected therewith adapted to uncouple the last-named drum from roller R', to revolve both drums independently of said roller, in one or the other direction, to indicate the rotary displacement of said drums, and couple both of them to their roller, for the purpose set forth.

6. The combination with the rollers R and R', the shutter sections J and J', a detent locking device adapted to lock roller R against rotation in an unwinding direction, the drums Z and Z' loose on shaft of roll R', gears V and V' secured to said drums Z and Z', respectively, means for coupling drum Z to roll R', and the cords S connected to the drums and the shutter sections as set forth; of the revoluble and endwise movable spindle H carrying the pinions K, K', in perpetual mesh with the aforesaid gears V and V' respectively, and appliances, controlled by the endwise movement of the spindle, adapted to uncouple and couple the drum Z to its roller, for the purpose set forth.

7. The combination with the rollers R and R', the shutter sections J and J', a detent locking device adapted to lock roller R against rotation in an unwinding direction, the drums Z and Z' loose on shaft of roll R', gears V and V' secured to said drums Z and Z', respectively, means for coupling drum Z to roll R', and the cords S connected to the drums and the shutter sections as set forth, of the revoluble and endwise movable spindle H carrying the pinions K, K' in perpetual mesh with the aforesaid gears V and V' respectively, and appliances, controlled by the endwise and rotary movements of the spindle, adapted to uncouple and couple the drum Z to its roller and indicate the rotary displacement of the spindle, respectively, for the purpose set forth.

In testimony that I claim the foregoing as my invention I have hereto signed my name in presence of two witnesses.

WALTER OEHMKE.

Witnesses:
RICHARD SCHMIDT,
WM. HAUPT.